United States Patent
Anderson

(10) Patent No.: US 12,474,523 B2
(45) Date of Patent: Nov. 18, 2025

(54) ARRAYED WAVEGUIDE GRATINGS WITH STABILIZED PERFORMANCE UNDER VARYING PARAMETERS

(71) Applicant: MACOM Technology Solutions Holdings, Inc., Lowell, MA (US)

(72) Inventor: Sean P. Anderson, Macungie, PA (US)

(73) Assignee: MACOM Technology Solutions Holdings, Inc., Lowell, MA (US)

( * ) Notice: Subject to any disclaimer, the term of this patent is extended or adjusted under 35 U.S.C. 154(b) by 0 days.

(21) Appl. No.: 18/499,598

(22) Filed: Nov. 1, 2023

(65) Prior Publication Data

US 2024/0061172 A1    Feb. 22, 2024

Related U.S. Application Data

(63) Continuation of application No. 17/368,482, filed on Jul. 6, 2021, now Pat. No. 11,815,716.

(51) Int. Cl.
  *G02B 6/12* (2006.01)

(52) U.S. Cl.
  CPC ...... *G02B 6/12011* (2013.01); *G02B 6/12009* (2013.01); *G02B 6/12014* (2013.01);
  (Continued)

(58) Field of Classification Search
  CPC ............ G02B 6/12011; G02B 6/12009; G02B 6/12028
  See application file for complete search history.

(56) References Cited

U.S. PATENT DOCUMENTS

| | | |
|---|---|---|
| 5,239,598 A | 8/1993 | Wight |
| 5,519,796 A | 5/1996 | Li |

(Continued)

FOREIGN PATENT DOCUMENTS

| | | |
|---|---|---|
| CN | 102749782 A * | 10/2012 |
| CN | 108369352 | 8/2018 |

(Continued)

OTHER PUBLICATIONS

International Search Report and Written Opinion issued by the Japanese Patent Office, dated Sep. 13, 2022, for International Patent Application No. PCT/US2022/036073; 9 pages.

Christopher Richard Doerr, "Advances in Silica Planar Lightwave Circuits", Journal of Lightwave Technology, vol. 24, No. 12, Dec. 2006; 27 pages.

(Continued)

*Primary Examiner* — Charlie Y Peng
(74) *Attorney, Agent, or Firm* — Faegre Drinker Biddle & Reath LLP

(57) ABSTRACT

An arrayed waveguide grating device includes an input coupler configured to receive a light signal and split the light signal into a plurality of output light signals. The device also includes a plurality of waveguides optically connected to the input coupler, each waveguide having a plurality of waveguide portions having respective sensitivities to variance in one or more parameters associated with operating of the optical arrayed grating device. Lengths of the respective portions are determined such that each waveguide applies a respective phase shift to the output light signal that propagates through the waveguide and the plurality of waveguides have at least substantially same change in phase shift with respective changes in the one or more parameters associated with operation of the device. An output coupler is optically connected to the plurality of waveguides to map respective light signals output from the plurality of waveguides to respective focal positions.

20 Claims, 4 Drawing Sheets

(52) U.S. Cl.
CPC ..... *G02B 6/12019* (2013.01); *G02B 6/12026* (2013.01); *G02B 6/12028* (2013.01); *G02B 2006/12097* (2013.01); *G02B 2006/12147* (2013.01); *G02B 2006/12164* (2013.01)

(56) References Cited

U.S. PATENT DOCUMENTS

| | | |
|---|---|---|
| 6,493,487 B1 | 12/2002 | Temkin |
| 6,697,550 B2 | 2/2004 | Chen |
| 2002/0154846 A1 | 10/2002 | Nolan |
| 2002/0172463 A1* | 11/2002 | Romanovsky ..... G02B 6/12023 385/39 |
| 2002/0181868 A1* | 12/2002 | McGreer ............ G02B 6/12023 385/37 |
| 2004/0247243 A1 | 12/2004 | Hida |
| 2005/0129363 A1 | 6/2005 | McGreer |
| 2006/0188193 A1 | 8/2006 | Lenzi |
| 2012/0051689 A1 | 3/2012 | Okayama |
| 2013/0101249 A1 | 4/2013 | Doerr |

FOREIGN PATENT DOCUMENTS

| | | | |
|---|---|---|---|
| EP | 1640754 A1 * | 3/2006 | ......... G02B 6/12011 |
| GB | 2406918 A * | 4/2005 | ............ B82Y 20/00 |
| JP | 2001-051139 | 2/2001 | |
| JP | 2006-003651 | 1/2006 | |
| JP | 2008-275708 | 11/2008 | |
| JP | 2011215331 A * | 10/2011 | |
| JP | 2018-085475 | 5/2018 | |

OTHER PUBLICATIONS

Michael C. Parker, Applications of Active Arrayed-Waveguide Gratings in Dynamic WDM Networking and Routing, Journal of Lightwave Technology, vol. 18, No. 12, Dec. 2000; 8 pages.

* cited by examiner

ARRAYED WAVEGUIDE GRATINGS WITH STABILIZED PERFORMANCE UNDER VARYING PARAMETERS

CROSS-REFERENCE TO RELATED APPLICATION

The present application is a continuation of U.S. patent application Ser. No. 17/368,482, filed Jul. 6, 2021, the disclosure of which is incorporated herein by reference.

FIELD

The present disclosure relates to semiconductor photonic devices and in particular to silicon based photonic devices, such as waveguides and demultiplexer devices.

BACKGROUND

An arrayed waveguide grating (AWG) is a device configured to separate light signals of different wavelengths into a plurality of paths, or to combine light signals of different wavelengths for transmission via a same communication channel, for example. Referring to FIG. 1, a conventional arrayed waveguide grating device 100 configured to separate light signals of different wavelengths includes an input coupler 102 (e.g., a star coupler), an output coupler 104 and a waveguide array 106 disposed between the input coupler 102 and the output coupler 104 (e.g., a star coupler). The input coupler 102 splits or diffuses an input light signal into a plurality of output light signals which are captured by a plurality of waveguides 108 of the waveguide array 106. The plurality of signals captured by the plurality of waveguides 108 propagate through the plurality of waveguides 108 to the output coupler 104. Respective waveguides 108 apply different phase shifts to the signals as the signals propagate through the waveguides 108, with the applied phase shift in each of the waveguide 108 generally determined by the length of the waveguide 108. Due to the different phase shifts applied to the signals, the signals are mapped to different points along the focal line at the output of the output coupler 104, allowing the signals to interfere coherently at the output of the output coupler 104.

Arrayed waveguide grating demultiplexer devices are often used as silicon-based demultiplexer device in fiber communication systems, such as wavelength division multiplexing (WDM) communication systems. Such silicon-based demultiplexer devices typically exhibit performance variation with varying parameters associated with operation of the devices, such as varying ambient temperature of operation of the device. Such performance variations cause the spectral response of a silicon-based demultiplexer device to shift to longer or shorter wavelength with changes or variances in the parameter (e.g., ambient temperature, waveguide active layer thickness, waveguide stress, etc.) experienced by the demultiplexer device. Referring to FIG. 1, parameter changes (e.g., changes in ambient temperature, waveguide active layer thickness, waveguide stress, etc.) result in different variance of phase shift in different ones of the waveguides 108. For example, a greater phase shift change may occur in a longer one of the waveguides 108 as compared to the phase shift change occurring in a shorter one or more waveguides 108, resulting in an overall change spectral response of the arrayed waveguide grating device 100. For example, over a typical operating temperature range of 5-85° C., a 20 nanometer (nm) shift in spectral response may occur. In at least some systems, such shift in the spectral response significantly impacts performance of the arrayed waveguide grating device 100 in the communication system. In some cases, for example, a 20 nanometer (nm) shift in the spectral response of the arrayed waveguide grating device 100 may equal channel spacing of the communication system.

To compensate for temperature effects, typical demultiplexer devices utilize active temperature tuners or stabilizers that include feedback control loops to measure and correct for changes in ambient temperature of operation of the demultiplexer device. A feedback control loop includes various components such as temperature monitor taps, digital to analog converters (DACs), analog to digital converters (ADCs), a microcontroller, etc. arranged to monitor and compensate for effects of varying temperature on the device. Such typical temperature tuners or stabilizers increase power consumption, size, complexity, cost, etc. of a typical silicon demultiplexer device. Therefore, a need exists for silicon-based demultiplexer devices that exhibit stable operation over varying parameters (e.g., ambient temperature) without a significant increase of power consumption, size, cost, complexity, etc. of the device.

SUMMARY

In an exemplary embodiment of the present disclosure, an arrayed waveguide grating device is provided. The arrayed waveguide grating device comprises an input coupler configured to receive a light signal and split the light signal into a plurality of output light signals. The arrayed waveguide grating device further comprises a plurality of waveguides optically connected to the input coupler, each waveguide having a plurality of waveguide portions, including at least a first waveguide portion having a first group index sensitivity to a variance in a parameter associated with operating of the optical arrayed grating device, and a second waveguide portion having a second group index sensitivity to the variance in the parameter associated with operating of the optical arrayed waveguide grating device. Respective first waveguide portions and respective second waveguide portions of the plurality of waveguides have respective lengths determined such that i) each waveguide, among the plurality of waveguides, applies a respective phase shift to the light signal that propagates through the waveguide and ii) the plurality of waveguides have at least substantially same change in phase shift with a change in the parameter associated with operation of the optical arrayed waveguide grating device. The arrayed waveguide grating device additionally comprises an output coupler optically connected to the plurality of waveguides, the output coupler configured to map respective light signals output from the plurality of waveguides to respective focal positions.

In an example thereof, the parameter associated with operation of the optical arrayed waveguide grating is one of i) an ambient temperature, ii) a waveguide active layer thickness, iii) a waveguide dispersion, iv) a waveguide strain, v) phase shift linearity, and vi) sidewall etch profile.

In another example thereof, the first waveguide portion of a particular waveguide among the plurality of waveguides has a first width, and the second waveguide portion of the particular respective waveguide among the plurality of waveguides has a second width different from the first width.

In yet another example thereof, the first waveguide portion of a particular waveguide among the plurality of waveguides comprises a waveguide of a first type, and the second waveguide portion of the particular waveguide among the plurality of waveguides comprises a waveguide of a second type different from the first type.

In a further example thereof, the first waveguide type is one of i) a rib waveguide, ii) a strip waveguide and iii) a loaded waveguide, and the second waveguide type is another one of i) a rib waveguide, ii) a strip waveguide and iii) a loaded waveguide.

In still another example thereof, each waveguide, among the plurality of waveguides, further comprises one or more interconnecting waveguide portions, wherein combined lengths of the one or more interconnecting waveguide portions in respective waveguides, among the plurality of waveguides, are at least substantially equal to each other.

In yet another example thereof, the parameter associated with operation of the arrayed waveguide grating comprises ambient temperature, and the arrayed waveguide grating device further comprises a heating element configured to compensate for a variance in temperature dependence of the plurality of waveguides to a varying thickness of a waveguide active layer.

In yet a further example thereof, respective waveguides, among the plurality of waveguides, comprise respective active layers and respective cladding layers, and the arrayed waveguide grating device further comprises one or more metal layers, positioned across the respective cladding layers, to at least substantially remove a temperature gradient across the plurality of waveguides.

In another exemplary embodiment of the present disclosure, an arrayed waveguide grating device is provided. The arrayed waveguide grating device comprises an input coupler configured to receive a light signal and split the light signal into a plurality of output light signals. The arrayed waveguide grating device further comprises a plurality of waveguides optically connected to the input coupler, each waveguide having a plurality of waveguide portions. Respective portions of the plurality of waveguides have i) respective sensitivities to variance in one or more parameters associated with operating of the optical arrayed grating device and ii) respective lengths determined such that a) each waveguide, among the plurality of waveguides, applies a respective phase shift to the output light signal that propagates through the waveguide and b) the plurality of waveguides have at least substantially same change in phase shift with respective changes in the one or more parameters associated with operation of the arrayed waveguide grating device. The arrayed waveguide grating device additionally comprises an output coupler optically connected to the plurality of waveguides, the output coupler configured to map respective light signals output from the plurality of waveguides to respective focal positions.

In an example thereof, the one or more parameters associated with operation of the optical arrayed waveguide grating device include one or more of i) an ambient temperature, ii) a waveguide active layer thickness, iii) a waveguide dispersion, iv) a waveguide strain, v) phase shift linearity, and vi) sidewall etch profile.

In a further example thereof, the plurality of waveguide portions of a particular waveguide among the plurality of waveguides have respective different widths.

In another example thereof, the plurality of waveguide portions of a particular waveguide among the plurality of waveguides are of respective different waveguide types.

In an further example thereof, the respective different waveguide types are selected from among i) a rib waveguide, ii) a strip waveguide and iii) a loaded waveguide.

In another example thereof, each waveguide, among the plurality of waveguides, further comprises one or more interconnecting waveguide portions, wherein combined lengths of the one or more interconnecting waveguide portions in respective waveguides, among the plurality of waveguides, are at least substantially equal to each other.

In yet another example thereof, the parameter associated with operation of the arrayed waveguide grating comprises ambient temperature, and the arrayed waveguide grating device further comprises a heating element configured to compensate for a variance in temperature dependence of the plurality of waveguides to a varying thickness of a waveguide active layer.

In a further still exemplary embodiment of the present disclosure, a method of de-multiplexing an optical signal. The method includes receiving a light signal and splitting the light signal into a plurality of output light signals. The method also includes propagating the plurality of output signals via a plurality of waveguides, each waveguide having a plurality of waveguide portions, wherein respective portions of the plurality of waveguides have respective lengths determined such that i) each waveguide, among the plurality of waveguides, applies a respective phase shift to the light signal that propagates through the waveguide and ii) the plurality of waveguides have at least substantially same change in phase shift with respective changes in one or more parameters associated with operation of the arrayed waveguide grating device. The method further includes mapping respective light signals output from the plurality of waveguides to respective focal positions.

In an example thereof, the parameter associated with operation of the optical arrayed waveguide grating comprises one of i) an ambient temperature, ii) a waveguide active layer thickness, iii) a waveguide dispersion, iv) a waveguide strain, v) phase shift linearity, and vi) sidewall etch profile.

In another example thereof, the plurality of waveguide portions of a particular waveguide among the plurality of waveguides have respective different widths.

In yet another example thereof, the plurality of waveguide portions of a particular waveguide among the plurality of waveguides are of respective different waveguide types.

In a further example thereof, the respective different waveguide type are selected from among i) a rib waveguide, ii) a strip waveguide and iii) a loaded waveguide.

BRIEF DESCRIPTION OF THE DRAWINGS

The above-mentioned and other features and advantages of this disclosure, and the manner of attaining them, will become more apparent and will be better understood by reference to the following description of exemplary embodiments taken in conjunction with the accompanying drawings, wherein.

Corresponding reference characters indicate corresponding parts throughout the several views. The exemplification set out herein illustrates an exemplary embodiment of the invention and such exemplification is not to be construed as limiting the scope of the invention in any manner.

DETAILED DESCRIPTION OF THE DRAWINGS

Figure 1:
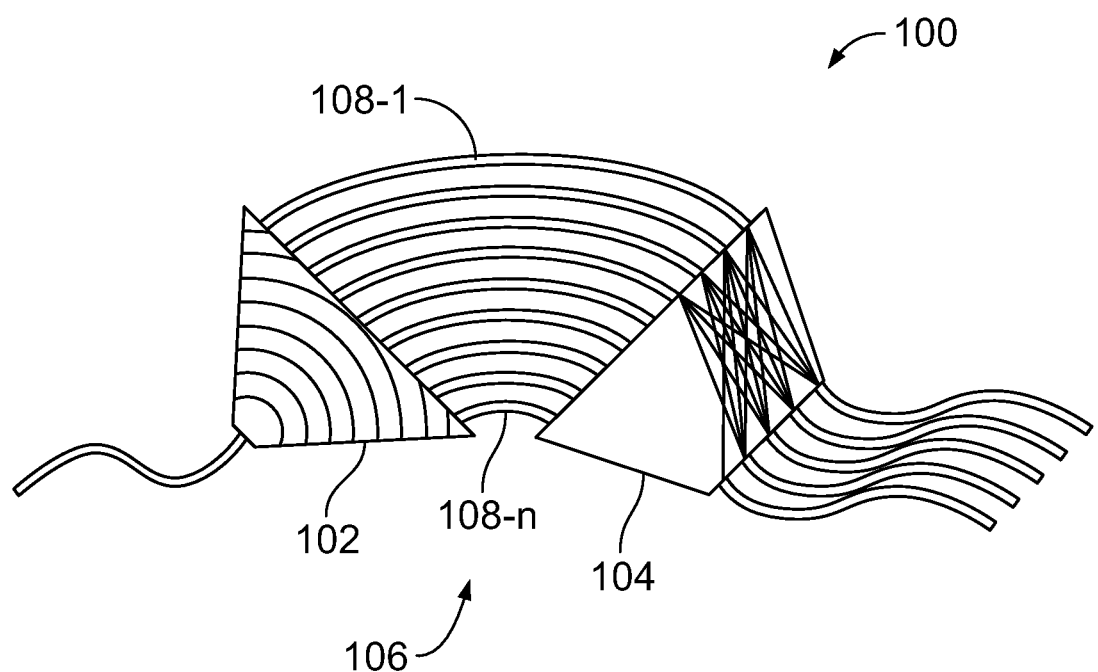
FIG. 1 is a diagram illustrating a conventional arrayed waveguide grating device.

For the purposes of promoting an understanding of the principles of the present disclosure, reference is now made to the embodiments illustrated in the drawings, which are described below. The embodiments disclosed herein are not intended to be exhaustive or limit the present disclosure to the precise form disclosed in the following detailed description. Rather, the embodiments are chosen and described so that others skilled in the art may utilize their teachings. Therefore, no limitation of the scope of the present disclosure is thereby intended. Corresponding reference characters indicate corresponding parts throughout the several views.

The terms "couples", "coupled", "coupler" and variations thereof are used to include both arrangements wherein the two or more components are in direct physical contact and arrangements wherein the two or more components are not in direct contact with each other (e.g., the components are "coupled" via at least a third component), but yet still cooperate or interact with each other.

In some instances throughout this disclosure and in the claims, numeric terminology, such as first, second, third, and fourth, is used in reference to various components or features. Such use is not intended to denote an ordering of the components or features. Rather, numeric terminology is used to assist the reader in identifying the component or features being referenced and should not be narrowly interpreted as providing a specific order of components or features.

Figure 2:
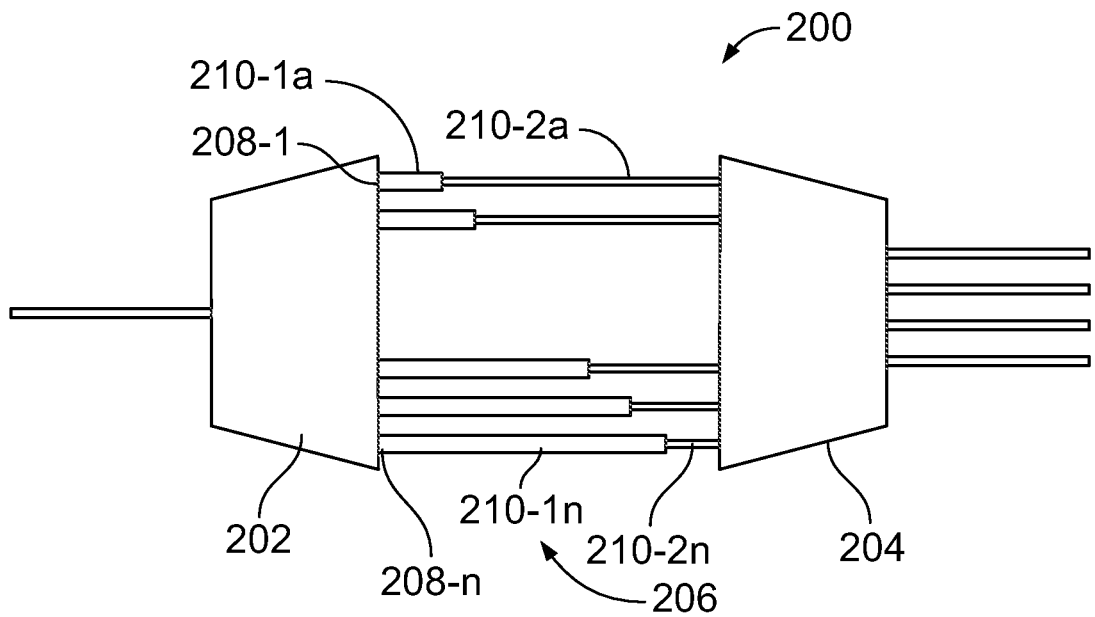
FIG. 2 is a diagram illustrating an exemplary arrayed waveguide grating device that includes multiple waveguide portions having different sensitivities to changes in one or more parameters associated with operation of the arrayed waveguide grating device, in accordance with an embodiment of the present disclosure.

FIG. 2 is a representative diagram illustrating an arrayed waveguide grating device 200 in accordance with an embodiment of the present disclosure. In embodiments, the arrayed waveguide grating device 200 is utilized as a demultiplexer in a wavelength division multiplexing (WDM) communication system (e.g., a coarse wavelength division multiplexing (CWDM) communication system), and for exemplary purposes the arrayed waveguide grating device 200 is described below as being a demultiplexer in a WDM communication system. In other embodiments, however, the arrayed waveguide grating device 200 is utilized as a component other than a demultiplexer (such as a multiplexer) in a WDM communication system, or as a component in a system other than a WDM communication system.

The arrayed waveguide grating device 200 includes an input coupler 202 (e.g., a star coupler), an output coupler 204 and a waveguide array 206 disposed between the input coupler 202 and the output coupler 204 (e.g., a star coupler). The input coupler 202 splits an input light signal into a plurality of output light signals that are then captured by a plurality of waveguides 208 of the waveguide array 206. The plurality of light signals captured by the plurality of waveguides 208 propagate through the plurality of waveguides 208 to the output coupler 204. The plurality of waveguides 208 apply different phase shifts to the light signals propagating through the waveguides 208 to the output coupler 204. Due to the different phase shifts applied to the light signals propagating through the waveguides 208, the light signals are mapped to different points along the focal line at the output of the output coupler 204, allowing the signals to interfere coherently at the output of the output coupler 204.

In embodiments, each waveguide 208 of the waveguide array 206 includes a plurality of waveguide portions 210 that are linked together in series for form the waveguide 208. In embodiments, the waveguide portions 210 comprise silicon semiconductor waveguides, such as waveguides fabricated as silicon on insulator (SOI) waveguides or other suitable materials such as silicon nitride, indium phosphide (InP), silica, etc. In embodiments, each waveguide portion 210 includes at least an active layer and a cladding layer that are formed by silicon (or other suit able material) depositing, sidewall etching, and/or other suitable processes for forming layered waveguides using any suitable silicon, substrate and insulator materials. As just an example, in an embodiment, 155 nm-thick silicon on insulator (SOI) waveguides are utilized. In other embodiments, other suitable waveguides are utilized. In some embodiments, the arrayed waveguide grating device 200 includes one or more layers of metal across the cladding layers of the waveguides 208. The one or more layers of metal across the cladding layers of the waveguides 208 shunt the waveguides 208 to at least substantially remove temperature gradient across the waveguides 208, thereby at least substantially equalizing temperature experienced across respective waveguides 208.

In embodiments, respective waveguide portions 210 of each waveguide 208 have respective different group index sensitivities to variances in one or more parameters associated with operation of the arrayed waveguide grating device 200, such as one or more of i) an ambient temperature, ii) a waveguide active layer thickness, iii) a waveguide dispersion, iv) a waveguide strain, v) phase shift linearity, and vi) sidewall etch profile, etc. As will be explained in more detail below, in embodiments, the different group index sensitives of the waveguide portions 210 are utilized to ensure that a phase shift change applied to the light signals propagating through the waveguides 208 remains at least substantially constant across the waveguides 208 with changes or variances of the one or more parameters, such as one or more of i) changes in an ambient temperature, ii) differences in waveguide active layer thickness, iii) variance in waveguide dispersion, iv) differences in waveguide strain, v) differences in phase shift linearity, and vi) variance of sidewall etch profile, etc.

In embodiment illustrated in FIG. 2, each waveguide 208 includes two waveguide portions 210, including a first waveguide portion 210-1 and a second waveguide portion 210-2. With two waveguide portions 210 in each waveguide 208, the arrayed waveguide grating device 200 may be designed to compensate for changes in a single parameter, such as ambient temperature, for example. In other embodiments, each waveguide 208 includes another suitable number (e.g., 3, 4, 5, 6, 3 etc.) of waveguide portions 210 that are used to compensate for respective changes or variances in a number of parameters greater than a single parameter. In general, with N waveguide portions 210 in each waveguide 208, the arrayed waveguide grating device 200 may be designed to compensate for respective changes or variances in N−1 parameters. An example embodiment with three waveguide portions in each of a plurality of waveguides of an arrayed waveguide grating device, configured to compensate for respective changes or variances in two different parameters, is described below with reference to FIG. 4.

Referring still to FIG. 2, the phase shift introduced by the waveguides 208 into light signals propagating through the waveguides 208 generally depends on respective lengths and effective indices of the first waveguide portion 210-1 and the second waveguide portion 210-2. In an embodiment, the first waveguide portion 210-1 has a first effective index, and the second waveguide portion 210-2 has a second effective index different from the first effective index. In mathematical terms, the phase shift introduced by the waveguide 208 in a path m through the waveguide array 206 is defined as $$n_{\mathit{eff},1}L_{1,m}+n_{\mathit{eff},2}L_{2,m}=\varphi_m \quad \text{Equation 1}$$

where $n_{\mathit{eff},1}$ is the effective index of the first waveguide portion 210-1, $L_{1,m}$ is the length of the first waveguide portion 210-1, $n_{\mathit{eff},2}$ is the effective index of the second waveguide portion 210-2, $L_{2,m}$ is the length of the second waveguide portion 210-2, and $\varphi_m$ is the phase shift applied to the light signal in the path m of the waveguide array 206.

In an embodiment, a constant phase change with changes of a parameter associated with operation of the arrayed waveguide grating device 200 is maintained across the plurality of waveguides 208 if the sum of the change of group index with change or variance of the parameter (e.g., ambient temperature T) experienced in the first waveguide portion 210-1 and the second waveguide portion 210-2 is constant across the plurality of waveguides 208. Thus, to ensure that at least substantially constant change in phase shift occurs across the waveguides 208 in an embodiment in which the parameter is ambient temperature, the first waveguide portion 210-1 and the second waveguide portion 210-2 of each waveguide 208 are designed to satisfy $$\frac{dn_{g,1}}{dT}L_{1,m} + \frac{dn_{g,2}}{dT}L_{2,m} = \text{constant} \quad \text{Equation 2}$$

where $n_{g,1}$ is the group index of the first waveguide portion 210-1 and where $n_{g,2}$ is the group index of the second waveguide portion 210-2.

Figure 3A:
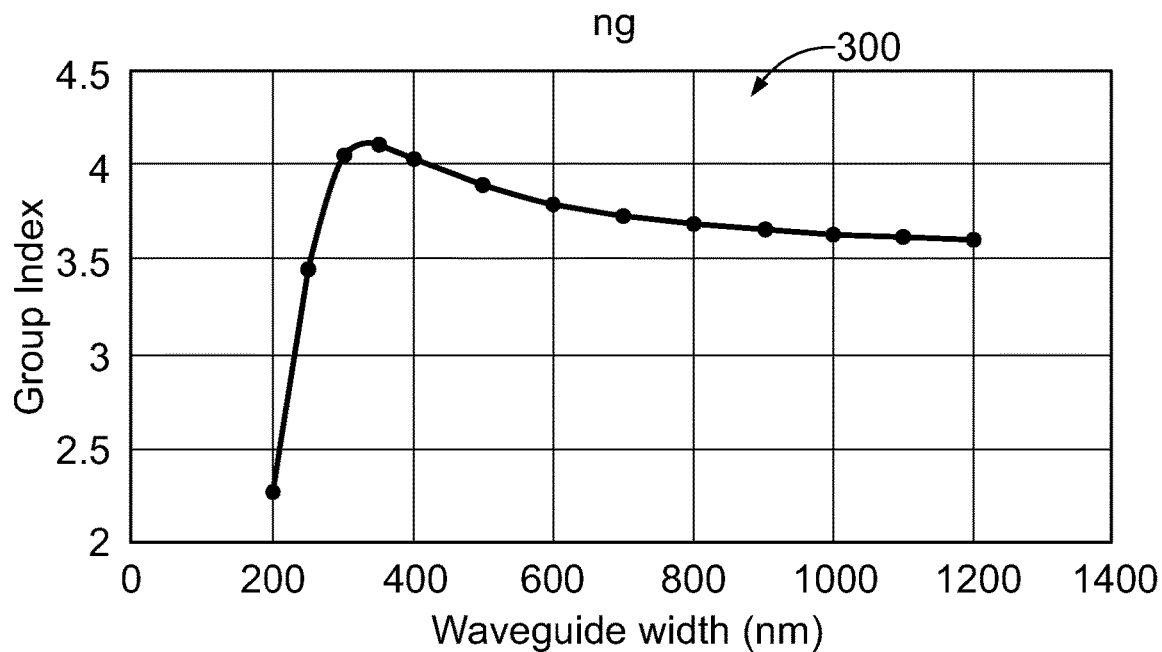
FIG. 3A illustrates a plot of a group index as a function of waveguide width for an example waveguide that may be utilized in an embodiment of the present disclosure.
Figure 3B:
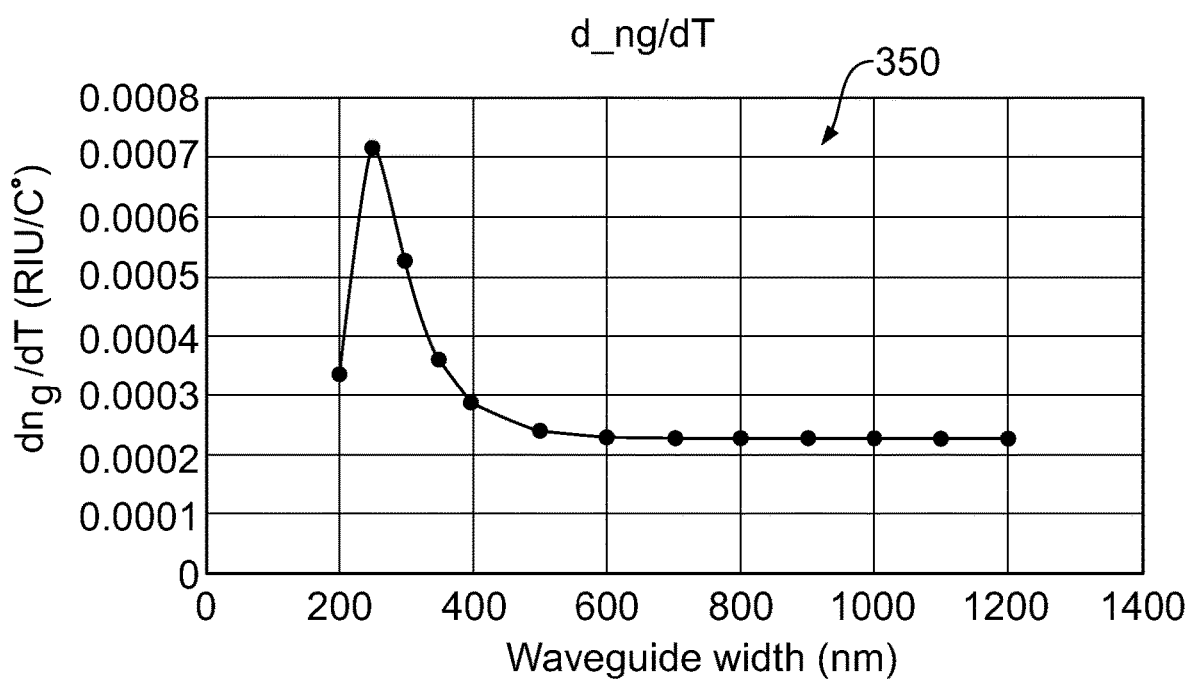
FIG. 3B is a plot illustrating a change in group index with varying ambient temperature as a function of waveguide width for an example waveguide that may be utilized in an embodiment of the present disclosure.

In embodiments, the first waveguide portion 210-1 and the second waveguide portion 210-2 have respective widths selected such that i) the first effective index of the first waveguide portion 210-1 is different from the second effective index of the second waveguide portion 210-2 and ii) the group index sensitivity to parameter variance of the first waveguide portion 210-1 is different from the group index sensitivity to parameter variance of the second waveguide portion 210-2. FIGS. 3A-B illustrate plots 300, 350 of, respective, a group index as a function of waveguide width and a rate of change of group index with a change of temperature (dφ/dT) for an example waveguide that may be utilized in embodiments of the present disclosure. The plots 300, 350 illustrated a group index as a function of waveguide width and a rate of change of group index with a change of temperature (dn/dT) for a 155 nm-thick silicon on insulator (SOI) waveguide. In other embodiments, other suitable waveguides may be utilized. In an embodiment, widths of waveguide portions 210 of FIG. 2 are selected from portions of the plots 300, 350 that correspond to areas with sufficient rate of change in group index to enable selection of different widths that correspond with sufficiently different group indices for the waveguide portions 210. For example, widths of the waveguide portions 210 are selected within the range of 200 nm to 600 nm. As can be seen in the plot 350 of FIG. 3B, the range of widths with changing group index for the waveguide also corresponds to a range of changing dn/dT for the waveguide. Thus, selection of widths within the range of 200 nm to 600 nm also enables selection of widths with sufficiently different sensitivities to temperature, in an embodiment.

In other embodiments, other suitable waveguide parameters are used to design the first waveguide portion 210-1 and the second waveguide portion 210-2 to have different effective group indices and group index sensitivities to compensate for change or variation in the parameter. For example, in some embodiments, different types of waveguides are utilized. For example, the first waveguide portion 210-1 may comprise one of i) a rib waveguide, ii) a strip waveguide or iii) a loaded waveguide, whereas the second waveguide portion 210-2 may comprise a different one of i) a rib waveguide, ii) a strip waveguide or iii) a loaded waveguide. In other embodiments, other suitable types of waveguides may be utilized.

Given particular configurations of the first waveguide portion 210-1 and the second waveguide portion 210-2, and the corresponding $n_{\mathit{eff}}$ an dn/dT of the first waveguide portion 210 and the second waveguide portion 210-2, the respective lengths of the first waveguide portion 210-1 and the second waveguide portion 210-2 in respective waveguides 208 may be determined by solving Equations 1 and 2 for the plurality of waveguides 208. In an embodiment, to simplify the process of designing the waveguide array 206, Equations 1 and 2 may be solved for only the first waveguide 208-1 and the last waveguide 208-n of the waveguide array 206. The lengths of the first waveguide portion 210-1 and the second portion 210-2 for each of the remaining waveguides 208 may be determined based on linear combinations of the lengths determined for the first waveguide 208-1 and the last waveguide 208-n. For example, the length of the first waveguide portions 210 of adjacent waveguides 208 may be incremented by a $\Delta L_1$ that may be determined based on the length $L_1$ of the first portion 210-la of the first waveguide 208-1, the length $L_1$ of the first portion 210-ln of the last waveguide 208-n, and the number of waveguides 208 in the waveguide array 206. Similarly, the length of the second waveguide portions 210-2a of adjacent waveguides 208 may be decremented by a $\Delta L_2$ determined based on the length $L_2$ of the second waveguide portion 210-2a of the first waveguide 208-1, the length $L_2$ of the second waveguide portion 210-2n of the last waveguide 208-n, and the number of waveguides 208 in the waveguide array 206.

Figure 4:
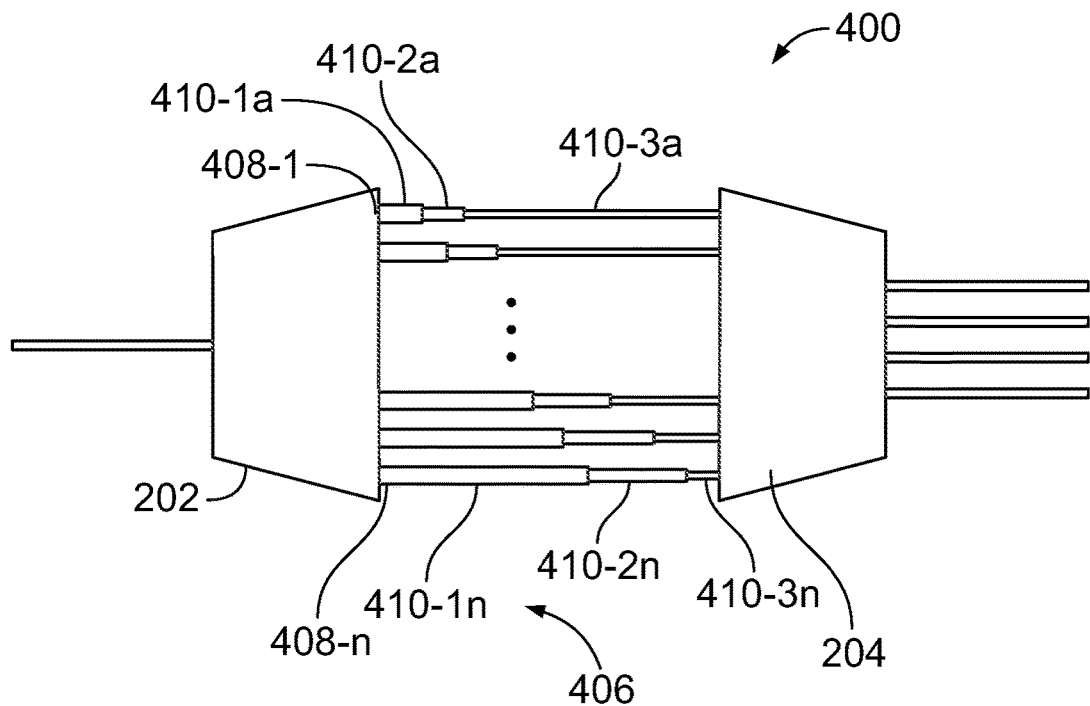
FIG. 4 is a diagram illustrating another exemplary arrayed waveguide grating device that includes multiple waveguide portions having different sensitivities to changes in one or more parameters associated with operation of the arrayed waveguide grating device, in accordance with an embodiment of the present disclosure.

FIG. 4 is a diagram illustrating another exemplary arrayed waveguide grating device 400 having multiple waveguide portions with different sensitivities to changes or variations of parameters associated with operation of the arrayed waveguide grating device 400, in accordance with embodiments of the present disclosure. The arrayed waveguide grating device 400 is generally similar to the arrayed waveguide grating device 200 of FIG. 2 except that whereas the arrayed waveguide grating device 200 utilizes waveguides 208 each having two waveguide portions 210, the arrayed waveguide grating device 400 utilizes waveguides 408 each having three waveguide portions 410, in the illustrated embodiment. In embodiments, the three waveguide portions 410 in arrayed waveguide grating device 400 are configured to compensate for variance of phase change with respective changes in two parameters associated with operation of the arrayed waveguide grating device 400.

The arrayed waveguide grating device 400 includes a plurality of waveguides 408, each waveguide 408 having three waveguide portions 410, including a first waveguide portion 410-1, a second waveguide portion 410-2 and a third waveguide portion 410-3. In an embodiment, respective waveguide portion 410 have respective different sensitivities to changes in two parameters associated with operation of the arrayed waveguide grating device 400. The phase shift introduced by the waveguides 408 into light signals propagating through the waveguides 408 generally depends on respective lengths and effective indices of the first waveguide portion 410-1, the second waveguide portion 410-2 and the third waveguide portion 410-3. The phase shift introduced by the waveguide 408 in the path m through the waveguide array 406 is defined as $$n_{eff,1}L_{1,m}+n_{eff,2}L_{2,m}+n_{eff,3}L_{3,m}=\varphi_m \quad \text{Equation 3}$$

where $n_{eff,1}$ is the effective index of the first waveguide portion 410-1, $L_{1,m}$ is the length of the first waveguide portion 410-1, $n_{eff,2}$ is the effective index of the second waveguide portion 410-2, $L_{2,m}$ is the length of the second waveguide portion 410-2, $n_{eff,3}$ is the effective index of the third waveguide portion 410-3, $L_{3,m}$ is the length of the third waveguide portion 410-3.

In embodiments, the three waveguide portions 410 in the arrayed waveguide grating device 400 are configured to compensate for variance of phase change with respective changes or variances in two parameters associated with operation of the arrayed waveguide grating device 400. In embodiments, a constant phase change with changes in a first parameter is maintained across the plurality of waveguides 408 if the sum of the change of group index with change or variance of the first parameter experienced in the plurality of waveguide portions 410 is constant across the plurality of waveguides 408. Thus, to ensure that at least substantially constant change in phase shift occurs across the waveguides 408 in an embodiment in which the first parameter is ambient temperature (T), the respective waveguide portions 410 are designed to satisfy $$\frac{dn_{g,1}}{dT}L_{1,m} + \frac{dn_{g,2}}{dT}L_{2,m} + \frac{dn_{g,3}}{dT}L_{3,m} = \text{constant} \quad \text{Equation 4}$$

where $n_{g,1}$ is the group index of the first waveguide portion 410-1, $n_{g,2}$ is the group index of the second waveguide portion 410-2 and $n_{g,3}$ is the group index of the third waveguide portion 410-3.

Similarly, to ensure that at least substantially constant change in phase shift occurs across the waveguides 408 in an embodiment in which the second parameter is waveguide active layer thickness (H), the respective waveguide portions 410 are designed to satisfy are designed to satisfy $$\frac{dn_{g,1}}{dH}L_{1,m} + \frac{dn_{g,2}}{dH}L_{2,m} + \frac{dn_{g,3}}{dH}L_{3,m} = \text{constant} \quad \text{Equation 5}$$

In embodiments, the first waveguide portion 410-1, the second waveguide portion 410-2 and the third waveguide portion 410-3 have respective widths selected such that the respective waveguide portion 410 have different group index sensitives to variations in both the first parameter (e.g., the ambient temperature T) associated with operation of the arrayed waveguide grating device 400 and the second parameter (e.g., the active layer thickness H) associated with operation of the arrayed waveguide grating device 400. In other embodiments, other suitable waveguide parameters are used to design respective waveguide portions 410 with different effective group indices and group index sensitivities to variations in both the first parameter associated with operation of the arrayed waveguide grating device 400 and the second parameter associated with operation of the arrayed waveguide grating device 400. In some embodiments, different types of waveguides are utilized. For example, different ones of i) a rib waveguide, ii) a strip waveguide or iii) a loaded waveguide may be utilized for the respective waveguide portions 410. In other embodiments, other suitable types of waveguides may be utilized.

Given particular configurations, and corresponding $n_{eff}$, $d\varphi/dT$ and $d\varphi/dH$ of the respective waveguide portions 410, the lengths of the respective portions 410 in respective waveguides 408 may be determined by solving Equations 3-5 for the plurality of waveguides 408. In matrix form, the lengths of the respective portions 410 in respective waveguides 408 may be determined by solving $$\begin{bmatrix} n_{eff,1} & n_{eff,2} & n_{eff,3} \\ \frac{dn_{g,1}}{dT} & \frac{dn_{g,2}}{dT} & \frac{dn_{g,3}}{dT} \\ \frac{dn_{g,1}}{dH} & \frac{dn_{g,2}}{dH} & \frac{dn_{g,3}}{dH} \end{bmatrix} \begin{bmatrix} L_{1,m} \\ L_{2,m} \\ L_{3,m} \end{bmatrix} = \begin{bmatrix} \varphi_m \\ 0 \\ 0 \end{bmatrix} \quad \text{Equation 6}$$

Solving equation 6 for $L_{1,m}$, $L_{2,m}$ and $L_{3,m}$ provides respective lengths of the first waveguide portion 410-1, the second waveguide portion 401-2 and the third waveguide portion 410-3 in each of the waveguides 408 that ensure at least substantially constant phase change across the waveguides 408 with change or variance in both the first parameter (e.g., ambient temperature T) and the second parameter (e.g., active layer thickness H) associated with operation of the waveguides 408. In other embodiments, respective lengths of the first waveguide portion 410-1, the second waveguide portion 401-2 and the third waveguide portion 410-3 in each of the waveguides 408 are determined to ensure at least substantially constant phase change across the waveguides 408 with variance in other combinations of parameters associated with operation of the arrayed waveguide grating device 400. For example, respective lengths of the first waveguide portion 410-1, the second waveguide portion 401-2 and the third waveguide portion 410-3 in each of the waveguides 408 are determined to ensure at least substantially constant phase change across the waveguides 408 with change or variance in any suitable combination of two or more of i) an ambient temperature, ii) a waveguide active layer thickness, iii) a waveguide dispersion, iv) a waveguide strain, v) phase shift linearity, and vi) sidewall etch profile.

Figure 5:
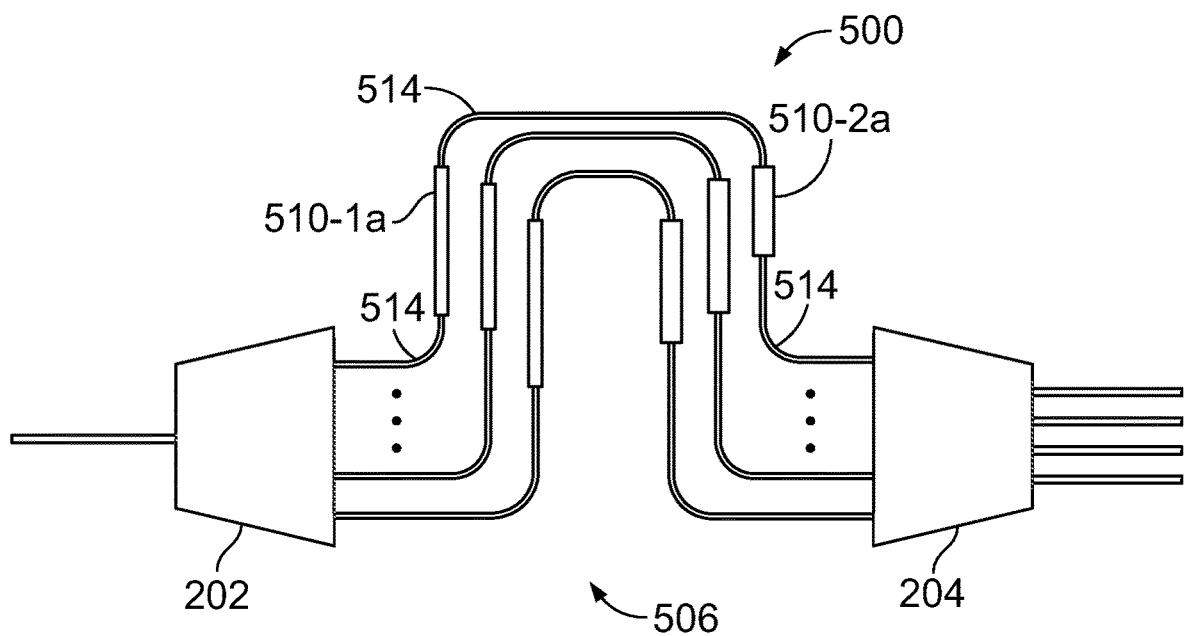
FIG. 5 is a diagram illustrating yet another exemplary arrayed waveguide grating device that includes multiple waveguide portions having different sensitivities to changes in one or more parameters associated with operation of the arrayed waveguide grating device, in accordance with an embodiment of the present disclosure.

FIG. 5 is a diagram illustrating another exemplary arrayed waveguide grating device 500 having multiple waveguide portions with different sensitivities to variance of one or more parameters associated with operation of the arrayed waveguide grating device 500, in accordance with embodiments of the present disclosure. The arrayed waveguide grating device 500 is generally the same as the arrayed waveguide grating device 200 illustrated in FIG. 2, in the illustrated embodiment. For example, the arrayed waveguide grating device 500 includes a plurality of waveguides each having two waveguide portions similar to the arrayed waveguide grating device 200 illustrated in FIG. 2. In other embodiments, the arrayed waveguide grating device 500 includes a plurality of waveguides each having a number of waveguide portions greater than two. As just an example, the arrayed waveguide grating device 500 is the same as or similar to the arrayed waveguide grating device 400 of FIG. 4, in an embodiment The arrayed waveguide grating device 500 includes a waveguide array 506 which, in turn, includes a plurality of waveguides 508. Each waveguide 508 includes a first waveguide portion 510-1 (generally corresponding to the first waveguide portion 210-1 in FIG. 2) and a second waveguide portion 510-2 (generally corresponding to the second waveguide portion 210-2 in FIG. 2). The configurations and lengths of the waveguide portions 510 are determined as described above with reference to FIG. 2 to ensure a constant change in phase with a change in an operating parameter (e.g., ambient temperature) across the plurality of waveguides 508. Each waveguide 508 additionally includes one or more interconnecting waveguide portions 514 arranged in series with the waveguide portions 510. In embodiments, the one or more interconnecting waveguide portions 514 are designed to more easily accommodate the different lengths of the waveguide portions 510 in the waveguide array 506. In an embodiment, combined length of one or more interconnecting waveguide portions 514 in the plurality waveguides 508 is at least substantially constant across the plurality of waveguides 508. The constant combined length of one or more interconnecting waveguide portions 514 in the plurality waveguides 508 ensures that overall sensitivity of the waveguides 508 to the operating parameter remains at least substantially constant across the plurality of waveguides 508. In embodiments, the width of the waveguide portions 514 is suitably selected to optimize interfacing of the waveguides 508 with the input coupler 202 and/or the output coupler 204. For example, the width of the waveguide portions 514 may be suitably selected to reduce mismatch loss between of the waveguides 508 with the input coupler 202 and/or the output coupler 204.

In some embodiments, one or more waveguide portions 514 may be omitted from waveguide array 506. For example, interface between the input coupler 202 in the waveguides 508 may be optimized by selecting an appropriate width for one or both of i) the first portions 510-1 of the waveguides 508 and ii) the second portions 510-2 of the waveguides 508 while still satisfying equations 1 and 2 for the waveguides 508, in an embodiment. In embodiments, the waveguide portions 510 and/or 514 may further comprise suitable transitions between different widths and/or types of the portions 510 and/or 514. For example, the waveguide portions 510 and/or 514 may be suitable tapered, as needed, to implement transitions between different widths of the he waveguide portions 510 and/or 514.

Figure 6:
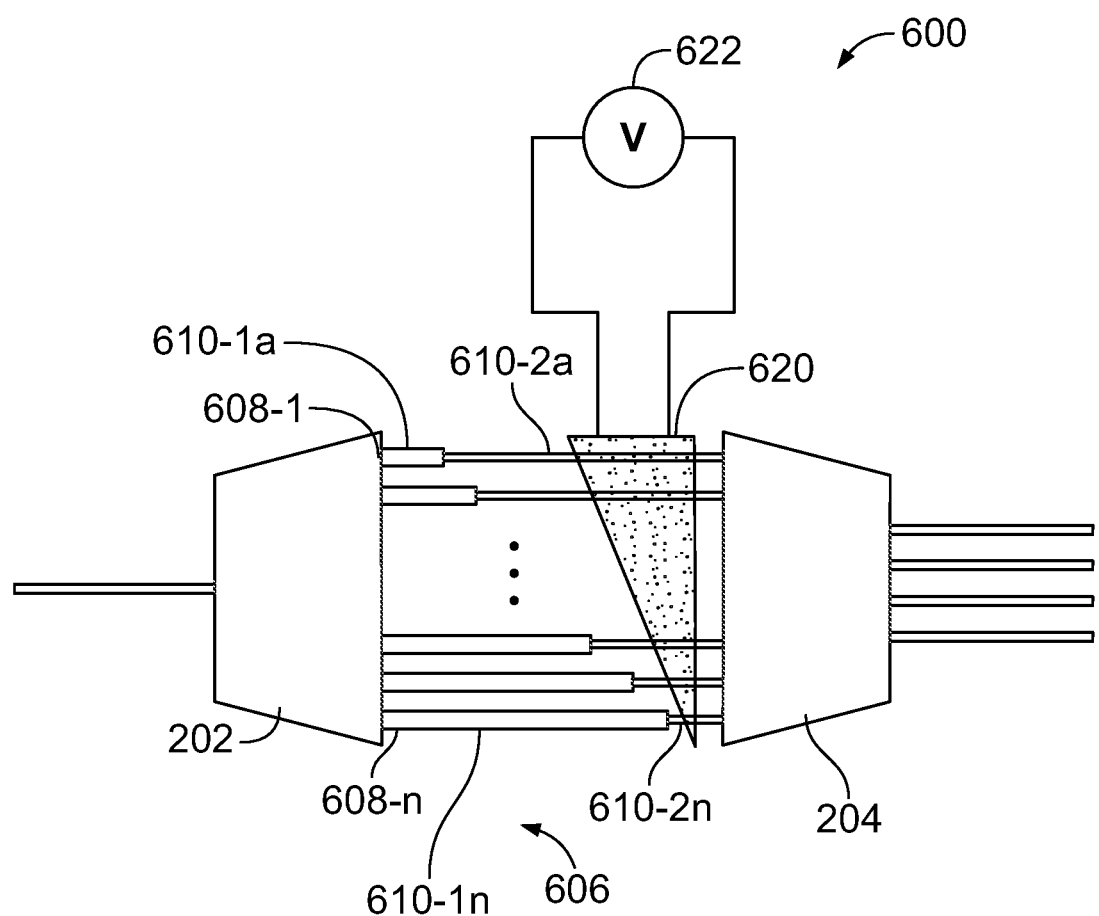
FIG. 6 is a diagram illustrating yet another exemplary arrayed waveguide grating device that includes multiple waveguide portions having different sensitivities to changes in one or more parameters associated with operation of the arrayed waveguide grating device, in accordance with an embodiment of the present disclosure.

FIG. 6 is a diagram illustrating another exemplary arrayed waveguide grating device 600 having multiple waveguide portions with different sensitivities to variance of one or more parameters associated with operation of the arrayed waveguide grating device 600, in accordance with embodiments of the present disclosure. The arrayed waveguide grating device 600 is generally the same as the arrayed waveguide grating device 200 illustrated in FIG. 2, in the illustrated embodiment. For example, the arrayed waveguide grating device 600 includes a plurality of waveguides each having two waveguide portions similar to the arrayed waveguide grating device 200 illustrated in FIG. 2. In other embodiments, the arrayed waveguide grating device 600 includes a plurality of waveguides each having a number of waveguide portions greater than two. As just an example, the arrayed waveguide grating device 600 is the same as or similar to the arrayed waveguide grating device 400 of FIG. 4, in an embodiment.

The arrayed waveguide grating device 600 includes a waveguide array 606 generally corresponding to the waveguide array 206 of FIG. 2. The waveguide array 606 includes a plurality of waveguides 608, each waveguide 608 having a first waveguide portion 610-1 (generally corresponding to the first waveguide portion 210-1 in FIG. 2) and a second waveguide portion 610-2 (generally corresponding to the second waveguide portion 210-2 in FIG. 2). The configurations and lengths of the waveguide portions 610 are determined as described above with reference to FIG. 2 to ensure a constant change in phase with a change in an operating parameter (e.g., ambient temperature) across the plurality of waveguides 608. The arrayed waveguide grating device 600 additionally includes a heating element 620 configured to further compensate for a varying change in phase shift with a change in the operating parameter that may be caused, for example, by a variance in thickness of the active layers of the waveguides 608. The heating element 620 has a triangular shape, in the illustrated embodiment. The heating element 620 has a suitable shape other than triangular in another embodiment. The heating element 620 is connected to a voltage element 622. The voltage element 622 is set to a voltage value that causes heat generated by the heating element 620 to compensate for the phase shift with a change in the operating parameter that may be caused by a variance in, for example, thickness of the active layers of the waveguides 608. In embodiments, the voltage value of the voltage element 622 is set during a factory calibration of the arrayed 600 to a voltage value that causes heat generated by the heating element 620 to compensate for the phase shift with a change in the operating parameter that may be caused by a variance in thickness of the active layers of the waveguides 608, for example.

An advantage, among others, of the disclosed arrayed waveguide grating device is that stability with respect to one or more parameters associated with operation of the arrayed waveguide grating device is achieved with a reduced complexity, power consumption, cost, etc. of the arrayed waveguide grating device. An advantage, among others, of the disclosed arrayed waveguide grating device is that stability with respect to an arbitrary number of parameters may be achieved without any significant increase in power consumption. An advantage, among others, of the disclosed arrayed waveguide grating device is that stability with respect to one or more parameters is achieved without a need to support additional non-optical components such as DACs, ADCs, drivers, microcontroller, etc.

While this invention has been described as having exemplary designs, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

I claim:

1. An arrayed waveguide grating device, comprising:
   an input coupler configured to receive a light signal and split the light signal into a plurality of output light signals, a plurality of waveguides optically connected to the input coupler, each waveguide having a plurality of waveguide portions, wherein each of the plurality of waveguides has an equal value of a first characteristic, the first characteristic being a summation of for each respective waveguide portion a change in group index of the respective waveguide portion to a change in a parameter associated with operating of the arrayed waveguide grating device multiplied by a length of the respective waveguide portion; and an output coupler optically connected to the input coupler through the plurality of waveguides, the output coupler configured to map respective light signals output from the plurality of waveguides to respective focal positions, wherein the plurality of waveguide portions comprises a first waveguide portion and a second waveguide portion directly linked together in series;

the first waveguide portion of a particular waveguide among the plurality of waveguides has a first effective index; and the second waveguide portion of the particular respective waveguide among the plurality of waveguides has a second effective index different from the first effective index.

2. The arrayed waveguide grating device of claim 1, wherein the parameter associated with operation of the arrayed waveguide grating device is one of i) an ambient temperature, ii) a waveguide active layer thickness, iii) a waveguide dispersion, iv) a waveguide strain, v) phase shift linearity, and vi) sidewall etch profile.

3. The arrayed waveguide grating device of claim 1, wherein each waveguide, among the plurality of waveguides, further comprises one or more interconnecting waveguide portions, wherein combined lengths of the one or more interconnecting waveguide portions in respective waveguides, among the plurality of waveguides, are at least substantially equal to each other.

4. The arrayed waveguide grating device of claim 1, wherein
the parameter associated with operation of the arrayed waveguide grating device comprises ambient temperature, and
the arrayed waveguide grating device further comprises a heating element configured to compensate for a variance in temperature dependence of the plurality of waveguides to a varying thickness of a waveguide active layer.

5. The arrayed waveguide grating device of claim 1, wherein
respective waveguides, among the plurality of waveguides, comprise respective active layers and respective cladding layers, and
the arrayed waveguide grating device further comprises one or more metal layers, positioned across the respective cladding layers, to at least substantially remove a temperature gradient across the plurality of waveguides.

6. The arrayed waveguide grating device of claim 1, wherein respective portions of the plurality of waveguides have i) respective sensitivities to variance in one or more parameters associated with operating of the arrayed waveguide grating device and ii) respective lengths determined such that a) each waveguide, among the plurality of waveguides, applies a respective phase shift to the output light signal that propagates through the waveguide and b) the plurality of waveguides have at least substantially same change in phase shift with respective changes in the one or more parameters associated with operation of the arrayed waveguide grating device.

7. The arrayed waveguide grating device of claim 6, wherein the one or more parameters associated with operation of the arrayed waveguide grating device include one or more of i) an ambient temperature, ii) a waveguide active layer thickness, iii) a waveguide dispersion, iv) a waveguide strain, v) phase shift linearity, and vi) sidewall etch profile.

8. The arrayed waveguide grating device of claim 6, wherein the plurality of waveguide portions of a particular waveguide among the plurality of waveguides have respective different widths.

9. The arrayed waveguide grating device of claim 6, wherein the plurality of waveguide portions of a particular waveguide among the plurality of waveguides are of respective different waveguide types.

10. The arrayed waveguide grating device of claim 9, wherein the respective different waveguide types are selected from among i) a rib waveguide, ii) a strip waveguide and iii) a loaded waveguide.

11. The arrayed waveguide grating device of claim 6, wherein each waveguide, among the plurality of waveguides, further comprises one or more interconnecting waveguide portions, wherein combined lengths of the one or more interconnecting waveguide portions in respective waveguides, among the plurality of waveguides, are at least substantially equal to each other.

12. The arrayed waveguide grating device of claim 6, wherein
the parameter associated with operation of the arrayed waveguide grating device comprises ambient temperature, and
the arrayed waveguide grating device further comprises a heating element configured to compensate for a variance in temperature dependence of the plurality of waveguides to a varying thickness of a waveguide active layer.

13. An arrayed waveguide grating device, comprising:
an input coupler configured to receive a light signal and split the light signal into a plurality of output light signals,
a plurality of waveguides optically connected to the input coupler, each waveguide having a plurality of waveguide portions, wherein each of the plurality of waveguides has an equal value of a first characteristic, the first characteristic being a summation of for each respective waveguide portion a change in group index of the respective waveguide portion to a change in a parameter associated with operating of the arrayed waveguide grating device multiplied by a length of the respective waveguide portion; and
an output coupler optically connected to the input coupler through the plurality of waveguides, the output coupler configured to map respective light signals output from the plurality of waveguides to respective focal positions, wherein
the plurality of waveguide portions comprises a first waveguide portion and a second waveguide portion;
the first waveguide portion of a particular waveguide among the plurality of waveguides has a first width, and
the second waveguide portion of the particular respective waveguide among the plurality of waveguides has a second width different from the first width.

14. The arrayed waveguide grating device of claim 13, wherein
the first waveguide portion of a particular waveguide among the plurality of waveguides comprises a waveguide of a first type, and
the second waveguide portion of the particular waveguide among the plurality of waveguides comprises a waveguide of a second type different from the first type.

15. The arrayed waveguide grating device of claim 14, wherein
the first type is one of i) a rib waveguide, ii) a strip waveguide and iii) a loaded waveguide, and
the second type is another one of i) a rib waveguide, ii) a strip waveguide and iii) a loaded waveguide.

16. A method of de-multiplexing an optical signal with an arrayed waveguide grating device, the method comprising:
receiving a light signal;
splitting the light signal into a plurality of output light signals;
propagating the plurality of output light signals via a plurality of waveguides, each waveguide having a plurality of waveguide portions, wherein each of the plurality of waveguides has an equal value of a first characteristic, the first characteristic being a summation of for each respective waveguide portion a change in group index of the respective waveguide portion to a change in a parameter associated with operating of the arrayed waveguide grating device multiplied by a length of the respective waveguide portion; and
mapping respective light signals output from the plurality of waveguides to respective focal positions, wherein
the plurality of waveguide portions comprises a first waveguide portion and a second waveguide portion directly linked together in series;
the first waveguide portion of a particular waveguide among the plurality of waveguides has a first effective index, and
the second waveguide portion of the particular respective waveguide among the plurality of waveguides has a second effective index different from the first effective index.

17. The method of claim 16, wherein the parameter associated with operation of the arrayed waveguide grating device comprises one of i) an ambient temperature, ii) a waveguide active layer thickness, iii) a waveguide dispersion, iv) a waveguide strain, v) phase shift linearity, and vi) sidewall etch profile.

18. The method of claim 16, wherein the plurality of waveguide portions of a particular waveguide among the plurality of waveguides have respective different widths.

19. The method of claim 16, wherein the plurality of waveguide portions of a particular waveguide among the plurality of waveguides are of respective different waveguide types.

20. The method of claim 19, wherein the respective different waveguide types are selected from among i) a rib waveguide, ii) a strip waveguide and iii) a loaded waveguide.

* * * * *